(12) United States Patent
Yang et al.

(10) Patent No.: US 10,157,254 B2
(45) Date of Patent: Dec. 18, 2018

(54) TECHNIQUES BASED ON ELECTROMIGRATION CHARACTERISTICS OF CELL INTERCONNECT

(71) Applicant: Taiwan Semiconductor Manufacturing Co., Ltd., Hsin-Chu (TW)

(72) Inventors: Kuo-Nan Yang, Hsinchu (TW); Chung-Hsing Wang, Baoshan Township (TW); Yi-Kan Cheng, Taipei (TW); Kumar Lalgudi, Fremont, CA (US)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 15/361,970

(22) Filed: Nov. 28, 2016

(65) Prior Publication Data
US 2017/0186691 A1   Jun. 29, 2017

Related U.S. Application Data

(60) Provisional application No. 62/272,148, filed on Dec. 29, 2015.

(51) Int. Cl.
*G06F 17/50* (2006.01)
*H01L 23/528* (2006.01)
*H03K 5/15* (2006.01)

(52) U.S. Cl.
CPC ...... *G06F 17/5077* (2013.01); *G06F 17/5081* (2013.01); *H01L 23/528* (2013.01);
(Continued)

(58) Field of Classification Search
None
See application file for complete search history.

(56) References Cited

U.S. PATENT DOCUMENTS 5,164,817 A * 11/1992 Eisenstadt .............. G06F 1/10
257/786
5,410,490 A * 4/1995 Yastrow ............ G06F 17/5036
716/112
(Continued)

FOREIGN PATENT DOCUMENTS

JP   2002016144 A   1/2002

OTHER PUBLICATIONS

A.B. Kahng et al., "Smart Non-Default Routing for Clock Power Reduction," 2013 ACM/DAC, 7 pages.*
(Continued)

*Primary Examiner* — Leigh M Garbowski
(74) *Attorney, Agent, or Firm* — Eschweiler & Potashnik, LLC

(57) ABSTRACT

In some embodiments, the present disclosure relates to a clock tree structure disposed on a semiconductor substrate. The clock tree structure includes a first clock line having a first line width and being arranged at a first height as measured from an upper surface of the semiconductor substrate. The clock tree structure also includes a second clock line having a second line width, which differs from the first line width. The second clock line is arranged at a second height as measured from the upper surface of the semiconductor substrate and the second height is equal to the first height. The first line width can be directly proportional to a first current level for the first clock line and the second line width can be directly proportional to a second current level for the second clock line.

20 Claims, 8 Drawing Sheets

(52) U.S. Cl.
CPC ..... *H03K 5/15066* (2013.01); *G06F 2217/62* (2013.01); *H01L 23/5283* (2013.01)

(56) References Cited

U.S. PATENT DOCUMENTS

| | | | | |
|---|---|---|---|---|
| 6,038,383 | A * | 3/2000 | Young | G06F 17/5036 703/14 |
| 6,779,125 | B1 | 8/2004 | Haban | |
| 6,857,113 | B2 * | 2/2005 | Gentry | G06F 17/5036 716/113 |
| 7,603,641 | B2 * | 10/2009 | Lin | G06F 17/5077 716/120 |
| 9,009,645 | B2 * | 4/2015 | Cao | G06F 17/5077 716/115 |
| 9,208,277 | B1 * | 12/2015 | Lamant | G06F 17/5077 |
| 9,311,440 | B2 * | 4/2016 | Kao | G06F 17/5072 |
| 9,727,683 | B2 * | 8/2017 | Liu | G06F 17/5077 |
| 9,786,663 | B2 * | 10/2017 | Rasouli | H01L 27/0921 |
| 2008/0256380 | A1 * | 10/2008 | Tsutsumi | G06F 1/10 713/500 |

OTHER PUBLICATIONS

S. Pullela et al., "Reliable Non-Zero Skew Clock Trees Using Wire Width Optimization," 30th ACM/IEEE Design Automation Conference, 1993, pp. 165-170.*

S. Pullela et al., "Low Power IC Clock Tree Design," IEEE 1995 Custom Integrated Circuits Conference, pp. 263-266. (Year: 1995).*

A. Rajaram et al., "MeshWorks: A Comprehensive Framework for Optimized Clock Mesh Synthesis," IEEE Trans. on Computer-Aided Design of Integrated Circuits and Systems, vol. 29, No. 12, Dec. 2010, pp. 1945-1958. (Year: 2010).*

"VLSI Clock Distribution," 16 pages, no author, no date.*

NPL1 (entitled "VLSI Clock Distribution") was downloaded from http://web.engr.oregonstate.edu/~traylor/ece474/vhdl_lectures/old_lecture_matl/clock_distribution.pdf on Oct. 4, 2016, 16 pages.

* cited by examiner

TECHNIQUES BASED ON ELECTROMIGRATION CHARACTERISTICS OF CELL INTERCONNECT

REFERENCE TO RELATED APPLICATION

This application claims priority to U.S. Provisional Application No. 62/272,148 filed on Dec. 29, 2015, the contents of which is hereby incorporated by reference in its entirety.

BACKGROUND

Electromigration is the transport of atoms within a conductive material, which is caused by collisions that transfer momentum between electrons passing through the conductive material (i.e., current) and the atoms of the conductive material. Modern day integrated circuit chips often experience electromigration in metal interconnect layers. For example, as electrons carry a current to a semiconductor device, the electrons collide with metal atoms in the metal interconnect layers. The collisions cause metal atoms within the metal interconnect layers to move (i.e., undergo electromigration), resulting in voids in the metal interconnect layers that can lead to integrated circuit failure.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
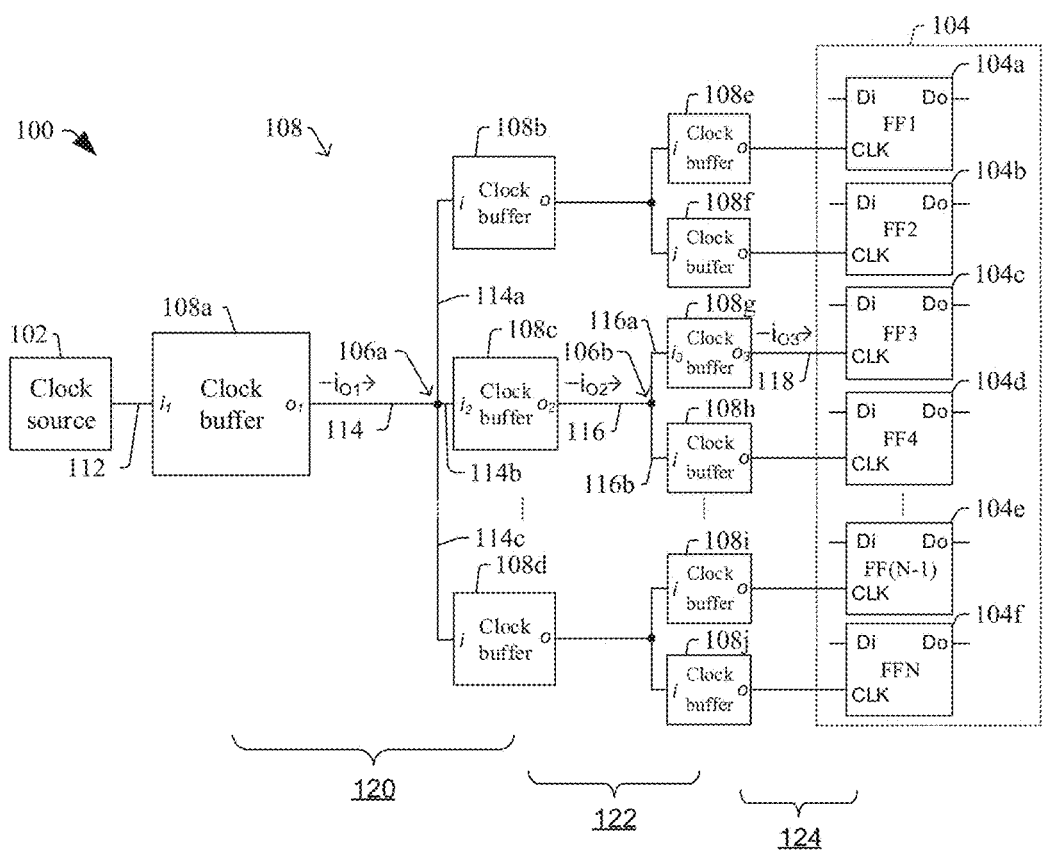
FIG. 1 illustrates a block diagram of a clock tree that provides a clock signal to a plurality of synchronous circuit elements according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, it will be appreciated that the terms "first", "second", "third", "fourth", and the like, are merely generic identifiers, and as such may be interchanged in various embodiments, such that a "first" element in one context may correspond to a "second" element, "third" element, etc., in other contexts. In addition, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

An integrated circuit layout is a representation of an integrated circuit (IC) in terms of geometric shapes whose patterns correspond to multiple IC layers. For example, the patterns of the geometric shapes can correspond to dielectric layers, metal layers, or semiconductor layers, such as n-type regions and p-type regions, among others, and collectively establish functional elements of the integrated circuit. The geometric shapes are fashioned in accordance with a circuit design specification, such as a SPICE (Simulation Program with Integrated Circuit Emphasis) netlist, which includes a plurality of functional elements, such as logic gates or transistors. The circuit design specification describes how the functional elements are to be operably coupled to establish a circuit design that will achieve the circuit design specification.

To help ensure the circuit design, when actually manufactured, conforms to the circuit design specification, the integrated circuit layout must pass a series of checks in a process known as physical verification. One part of physical verification is design-rule checking (DRC), which determines whether the integrated circuit layout satisfies a set of recommended parameters called design rules. A set of design rules specifies certain geometric and connectivity restrictions for the various IC layers to ensure sufficient margins to account for variability in semiconductor manufacturing processes, so as to ensure that most of the manufactured ICs work correctly. Some examples of design rules for DRC include: minimum active-to-active spacing, minimum well-to-well spacing, minimum channel length for transistors, minimum metal width for interconnect lines, and minimum metal-to-metal spacing.

Many of the rules in DRC are "default" rules, in that these rules are based on parameters provided by the fabrication facility and are generally applicable to all patterns for a given layer. The DRC rules can be specified in terms of a scaling factor, often called lamba ("$\lambda$"); or can be specified in terms of an actual dimension. For example, a fabrication facility can provide a user with default rules for metal 3 line widths and spacings with a scaling factor $\lambda=2$ μm, where each metal 3 line has a minimum width of $5\lambda$ (or 1 μm) and where nearest sidewalls of neighboring metal lines are spaced apart by a minimum spacing of $3\lambda$ (or 0.6 μm). If a metal 3 line is narrower than this minimum spacing or if neighboring metal lines are spaced more closely than the minimum spacing, there is an increased likelihood the fabrication facility will be unable to correctly manufacture the part or the part will have reliability concerns after fabrication. Thus, a DRC error is flagged in such cases, and the width of the metal 3 line can be increased or the spacing between the neighboring metal lines can be increased to alleviate the design concern.

In some cases, however, designers may want to "relax" or "tighten" these default rules for special cases where sensitive nets or lines are involved for some, but not all, geometric shapes for a given layer. For example, because clock signals transmitted on clock lines are extremely sensitive to clock skew, designers may want to use a non-default-rule (NDR) for clock lines for an metal3 layer while other M3 lines can still adhere to default rules rather than non-default rules. In some cases, for example, the NDR for clock lines can correspond to double-wide or triple-wide metal lines for clock lines and at least double-wide spacing between clock lines to help ward off potential timing issues. In principle, NDRs can be whatever the designer specifies as long as it follows DRC rules (no violating the minimum or maximum metal widths, for example).

Aspects of the present disclosure lie in an appreciation that non-default-rule (NDR) lines all having the same width as one another (e.g., width of each NDR line is "fat", such as double-wide or triple-wide metal lines) can be less than optimal. It has been appreciated that selectively using narrower NDR lines for some clock lines and wider NDR lines for other clock lines can improve routing efficiency as it allows more clock lines to be "squeezed" into a given area and can optimize routing and capacitance concerns. Thus, due to current loading between different NDR lines, for example due to differences in the NDR lines' locations within a clock tree, the width of NDR lines can be set as a function of the current expected to be supplied to them. For example, if a higher output current is expected to be supplied to a first NDR line, the first NDR line can be made wider; whereas a second, thinner NDR line can be used where lower output current is expected. The first NDR line being wider can help to offset electromigration concerns for the first NDR line due to the higher output current expected through the first NDR line, while the second NDR line being thinner can still provide sufficient electromigration assurances while at the same time reducing the routing area for the line and freeing up routing area for other lines.

For synchronized integrated circuit designs, data transfer between functional elements of the circuit are synchronized by one or more clock signals that are provided via a clock tree. Referring to FIG. 1, one can see a clock tree 100, which couples a clock source 102 to a number of synchronous circuit elements 104. The clock source 102 can manifest as a phase-locked loop (PLL), crystal oscillator, or other type of on-chip oscillator or off-chip oscillator; and the synchronous circuit elements 104 each receive the clock signal via the clock tree 100. The synchronous circuit elements 104 are illustrated as flip-flops 104a-104f, which each have a data-in terminal (Di), a data-out terminal (Do), and a clock terminal (CLK). Connections to the Di and Do terminals are omitted for ease of understanding and viewing, but it will be appreciated the Di and Do terminals can be coupled to synchronous or asynchronous circuits to achieve a suitable circuit function. In some embodiments, the synchronous circuit elements 104 may be volatile memories (such as SRAM, DRAM, etc.) and/or nonvolatile memories (such as flash, MRAM, RRAM, PCRAM, FRAM, etc.).

The clock tree 100 includes a tree root line 112 coupled to the clock source 102, and branch points (e.g., 106a, 106b) at which a clock line splits into two or more clock lines. For example, a first clock line 114 splits or branches into three clock lines 114a, 114b, 114c at branch point 106a; and a second clock line 116 splits or branches into two clock lines 116a, 116b at branch point 106b. Some clock lines, such as third clock line 118, may not split or branch, but rather may extend continuously from one circuit element to another circuit element. It will be appreciated that the illustrated clock tree 100 of FIG. 1 is merely an example, and any variety of clock tree structures are contemplated as falling with the scope of the present disclosure, including but not limited to: H-tree arrangements, zero-clock skew arrangements, clock trees with multiple clock sources, etc.

Clock buffer elements 108 are arranged on various clock lines within the clock tree 100. For example, a first clock buffer element 108a, a second clock buffer element 108c, and a third clock buffer element 108g are labeled and will be described in more detail below. The first clock buffer element 108a has a first input ($i_1$) and a first output ($o_1$), the second clock buffer element 108c has a second input ($i_2$) and a second output ($o_2$), and the third clock buffer element 108g has a third input ($i_3$) and a third output ($i_3$), with clock lines operably coupling the clock buffer elements 108 as shown. Other clock buffer elements also have inputs (i) and outputs (o), but a detailed discussion is omitted for clarity.

The number of branches between one clock buffer element and the next level of clock buffers is known as "fan out". Thus, a first clock tree region 120 tends to have more branches split from a single clock line (e.g., three clock lines 114a, 114b, 114c split from the first clock line 114), while a second clock tree region 122 tends to have fewer branches split from a single clock line (e.g., two branches split from each clock line in the second clock tree region 122); and a third clock tree region 124 has limited or zero branching/splits. Thus, the illustrated first clock tree region 120 has more fan out than the second clock tree region 122, and the second clock tree region 122 has more fan out than the third clock tree region 124. Although some fan out will be present due to the nature of a clock tree 100, particularly large fan out, if left unmitigated, can lead to large capacitance values at disparate regions within the clock tree and can cause driving issues and/or clock skew issues within the clock tree 100.

To limit fan out issues, the clock buffer elements 108 are sized to deliver different respective output currents based on their respective locations in the clock tree. Thus, the first clock buffer element 108a has transistors that are sized to deliver a first output current level $i_{o1}$ from the first output $o_1$. A portion of the first output current level $i_{o1}$ is delivered to the input $i_2$ of the second clock buffer element 108c via the first clock line 114, while other portions of $i_{o1}$ go to clock buffer elements 108b and 108d.

The second clock buffer element 108c has transistors that are sized to deliver a second output current level $i_{o2}$ from the second output $o_2$. A portion of the second output current level $i_{o2}$ is delivered to the input $i_3$ of the third clock buffer element 108g via the second clock line 116, while another portion of $i_{o2}$ goes to clock buffer 108h. The second output current level $i_{o2}$ differs from the first output current level $i_{o1}$. In FIG. 1's illustrated embodiment, for example, the first output current level $i_{o1}$ can be higher than the second output current level $i_{o2}$ to help offset the fact that the first clock tree region 120 has a larger fan out than the second clock tree region 122. This can help limit driving and/or clock skew issues.

The third clock buffer element 108g has transistors that are sized to deliver a third output current level $i_{o3}$ from the third output $o_3$. The third clock line 118 couples the third clock buffer element 108g to a synchronous circuit element (e.g., flip flop 104c). The third output current level $i_{o3}$ can differ from each of the first output current level $i_{o1}$ and the second output current level $i_{o2}$. In FIG. 1's illustrated embodiment, for example, the first output current level $i_{o1}$ and second output current level $i_{o2}$ are each higher than the third current output level $i_{o3}$ to help offset the fact that the first and second clock tree regions 120, 122 have larger fan out than the third clock tree region 124. However, it will be appreciated that FIG. 1 is merely an example and in other embodiments other output current levels and other fan outs are contemplated as falling within the scope of this disclosure.

The clock lines (e.g., 114, 116, 118) have line widths which are set based on the output current level expected to be carried by the corresponding clock line. Thus, first clock line 114 has a first line width $w_1$ which is directly proportional to the first output current level $i_{o1}$, and the second clock line 116 has a second line width $w_2$ which is directly proportional to the second output current level $i_{o2}$. The third clock line 118 similarly has a third line width $w_3$ which is directly proportional to the third output current level $i_{o3}$ The widths of these lines can be calculated and adjusted on a buffer-by-buffer basis during clock tree synthesis, and thus each clock buffer element 108 can have its own line width at its output which corresponds to its own output current level and which can be unique based on that buffer's location in the clock tree 100. This provides a good balance between electromigration assurance and routing area minimization, and can be done according to routing techniques that are efficient in that they can use standard buffer cells and perform line-width adjustments in upper layer metal layers with little or no changes being required for the underlying standard cells.

Figure 2:
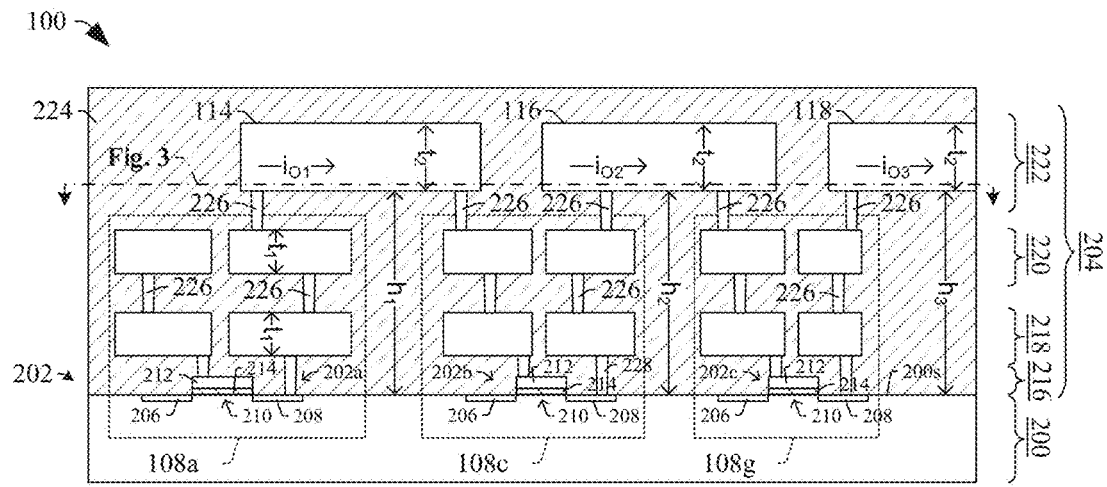
FIG. 2 illustrates an example cross-sectional view of first, second, and third clock buffer elements for some embodiments consistent with FIG. 1.

FIG. 2 illustrates a cross-sectional view of a portion of the clock tree 100 including the first clock buffer element 108a, second clock buffer element 108c, and third clock buffer element 108g, which are arranged in and/or over semiconductor substrate 200, such as a silicon or silicon-on-insulator substrate. Semiconductor devices 202 are included within the clock buffer elements and are disposed in and/or over the substrate 200. An interconnect structure 204 is disposed over the substrate 200 and operably couples the semiconductor devices to one another.

In FIG. 2's embodiment, the semiconductor devices 202 are illustrated as metal oxide semiconductor field effect transistors (MOSFETs) 202a, 202b, 202c, although other types of devices such as bipolar junction transistors (BJTs), fin field effect transistors (FinFETs), diodes, junction field effect transistors (JFETS), among others, could also be used. The illustrated MOSFETs include source regions 206 and drain regions 208, which have a first conductivity type, and channel regions 210 which separate the source and drain regions and which have a second conductivity type opposite the first conductivity type. Conductive gate electrodes 212, which can be made of polysilicon or metal, such as copper or aluminum, overlie the channel regions 210, and are separated from the channel regions 210 by gate dielectrics 214.

The interconnect structure 204 includes a number of conductive layers that are stacked over one another, and a number of vias that extend vertically between adjacent conductive layers. For example, the illustrated interconnect structure 204 includes a gate layer 216, metal1 layer 218, metal2 layer 220, and metal3 layer 222, although it will be appreciated that any number of conductive layers may be present. Each conductive layer is typically made of polysilicon or a metal, such as copper or aluminum for example. Within each conductive layer, conductive lines extend horizontally in one or more directions and act as wires. A dielectric structure 224, such as silicon dioxide or a low-k dielectric material for example, provides electrical isolation between the various conductive layers. Vias 226 extend vertically between adjacent conductive layers to operably couple the metal lines, and contacts 228 extend vertically to ohmically couple the metal1 lines to the semiconductor devices 202. Within the interconnect structure 204, one or more lower metal layers such as layers 218 and 220 in FIG. 2 can each have a first thickness $t_1$. One or more upper metal layer such as layer 222 can have a second thickness $t_2$ that is greater than the first thickness $t_1$.

In some embodiments, the first clock line 114, second clock line 116, and third clock line 118 are disposed within the upper metal layers 222. The first clock buffer 108a has a first output coupled to the second input of the second clock buffer 108c through the first clock line 114, and the second clock buffer 108c has a second output coupled to the third input of the third clock buffer 108g through the second clock line 116. The first clock line 114, second clock line 116, and third clock line 118 are illustrated as being arranged at a first height $h_1$, second height $h_2$, and third height $h_3$, respectively, as measured from an upper surface 200s of the semiconductor substrate 200. In some embodiments, the first, second, and third heights ($h_1$, $h_2$, and $h_3$) are equal, and/or the first, second and third clock lines 114, 116, 118 have uppermost surfaces that are co-planar with one another. In some embodiments, the first, second and third clock lines 114, 116, 118 have at least one surface that are co-planar with one another.

Figure 3:
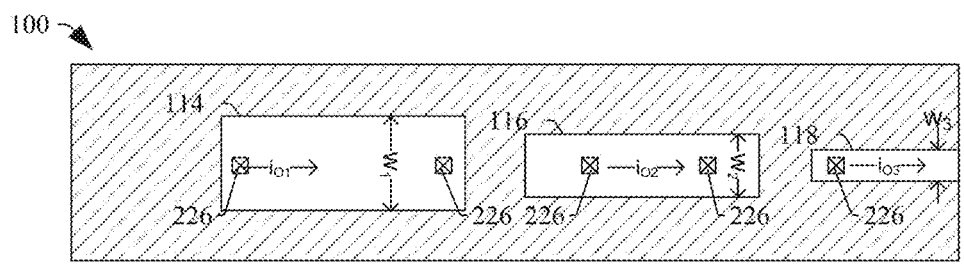
FIG. 3 illustrates an example top layout view of an upper metal layer of first, second, and third clock buffer elements for some embodiments consistent with FIG. 2.

As shown in FIG. 3, which shows a sample layout plane view of the upper metal layers 222 as indicated by the cut-away line in FIG. 2, the first clock line 114 has a first line width, $w_1$, the second clock line 116 has a second line width $w_2$, and the third clock line 118 has a third line width $w_3$. In some embodiments, the second line width $w_2$ is a first integer multiple of the third line width $w_3$, and the first line width $w_1$ is a second integer multiple of the third line width $w_3$; with the second integer multiple being greater than the first integer multiple in the illustrated example. In some embodiments, the second line width $w_2$ ranges from 1.1 times the third line width $w_3$ to approximately three times the third line width w3; and the first line width $w_1$ ranges from 1.1 times the second line width $w_2$ to approximately three times the second line width $w_2$. The first, second, and third line widths ($w_1$, $w_2$, $w_3$) are directly proportional to the first, second, and third output current levels ($i_{o1}$, $i_{o2}$, $i_{o3}$, respectively) expected to be carried by the first, second, and third clock lines (114, 116, 118, respectively). Thus, the first line width $w_1$ is directly proportional to the first output current level, $i_{o1}$; the second line width $w_2$ is directly proportional to the second output current level, $i_{o2}$, and the third line width $w_3$ is directly proportional to the third output current level, $i_{o3}$. Because the first, second, and third output currents $i_{o1}$, $i_{o2}$, $i_{o3}$, are expected to be different, due to differences in fan out in this example, the first, second, and third line widths $w_1$, $w_2$, $w_3$ are different. In the illustrated example, the first output current $i_{o1}$ is expected to be greater than the second output current $i_{o2}$, and the first line width $w_1$ is greater than the second line width $w_2$; the second output current $i_{o2}$ is expected to be greater than the third output current $i_{o3}$, and the second line width $w_2$ is greater than the third line width $w_3$. These line width differences help to mitigate electromigration concerns due to these differences in output current, while also allowing dense routing to be achieved.

In some embodiments, the line widths are directly proportional to the corresponding output current level they are expected to experience, meaning that as the output current expected to be carried by a given clock line increases, the line width can also be correspondingly increased, linearly or otherwise. Conversely, if the output current expected to be carried by the clock line is decreased, the corresponding line width can be decreased, linearly or otherwise.

In some embodiments, the lower metal layers 218, 220 are default-rule layers in the IC layout, while lines in upper metal layer 222 can include a mixture of default-rule lines, such as non-clock metal lines, and non-default-rule (NDR) lines, such as clock lines. The default-rule lines (e.g., non-clock metal lines) in the upper metal layer 222 can have thicknesses $t_2$ that are the same as that of the NDR lines (e.g., clock lines) in the upper metal layer 222, and in some embodiments can have metal line widths that are independent of the output current level that they carry. Thus, depending on how the design synthesis was carried out, the upper metal layer 222 (e.g., M3) can include "default-rule" M3 metal lines (e.g., which each have width, $w_4$, which is the same as that of the other default-rule M3 lines and is independent of output current for those lines), as well as NDR M3 metal lines that have different line widths which vary depending on the output current level they are expected to carry (e.g., $w_1$, $w_2$, and $w_3$ in FIG. 3). In other embodiments, these default-rule non-clock metal lines can also have metal line widths that are dependent on the output driving current that they carry, similar to the clock lines.

Figure 4:
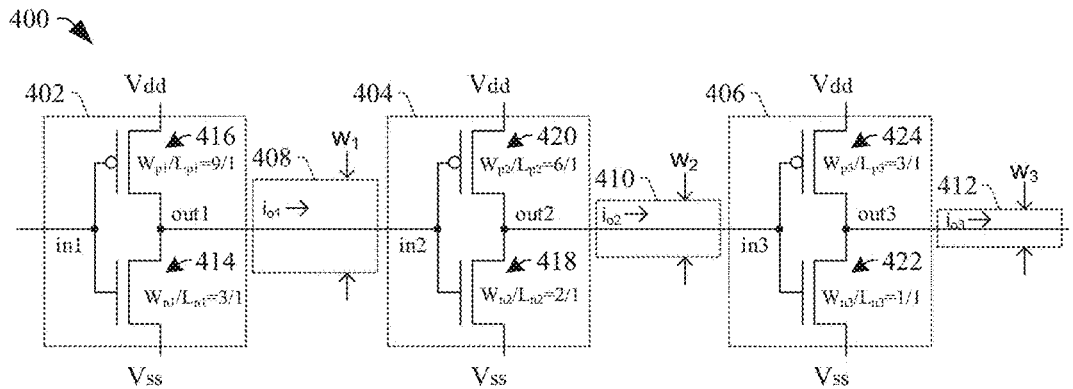
FIG. 4 illustrates a schematic diagram of two inverters, which are one example of circuit elements and/or clock buffer elements in accordance with some embodiments.

Although FIGS. 1-3 have been described and illustrated with regards to a clock tree 100, it will be appreciated that although there are distinct advantages in applying the present disclosure to clock tree structures, the disclosure is not limited to this application. Thus, FIG. 4 shows some embodiments of an integrated circuit 400 that can be applicable to clock tree structures but is also applicable to other synchronous circuits and/or asynchronous circuits. The integrated circuit 400 includes a first circuit element 402, a second circuit element 404, and third circuit element 406. A first metal line 408 couples an output (out1) of the first circuit element 402 to an input (in2) of the second circuit element 404. A second metal line 410 couples an output (out2) of the second circuit element 404 to an input (in3) of the third circuit element 406, and a third metal line 412 is coupled to an output (out3) of the third circuit element 406.

The first, second, and third metal lines (408, 410, 412, respectively) have first, second, and third line widths, ($w_1$, $w_2$, $w_3$, respectively) which are dependent on the first, second, and third output current levels ($i_{o1}$, $i_{o2}$, $i_{o3}$, respectively) which they are expected to carry. Thus, the first metal line 408 has a first line width $w_1$ which is directly proportional to the first current output level $i_{o1}$ according to a line-width-to-output-current ratio ($w/i_o$). The second metal line 410 has a second line width $w_2$ which differs from the first line width $w_1$, but which is directly proportional to the second current output $i_{o2}$ level according to the line-width-to-output-current ratio ($w/i_o$). The third metal line 412 has a third line width $w_3$ which differs from the first and second line widths $w_1$, $w_2$; but which is directly proportional to the third current output $i_{o3}$ level according to the line-width-to-output-current ratio ($w/i_o$).

For purposes of illustration and for ease of understanding, the first circuit element 402 is depicted as a first inverter and the second circuit element 404 is depicted as a second inverter, though the disclosure is not limited to the use of inverters for these circuit elements. The first inverter is made up of a first nmos transistor 414 and a first pmos transistor 416, whose gate electrodes receive a first input signal (in1) and whose source/drain regions deliver a first output signal (out1). For purposes of illustration, the first nmos transistor 414 is illustrated as having a width-to-length ratio ($w_{n1}/l_{n1}$) of 3/1, while the first pmos transistor 416 is illustrated as having a $w_{p1}/l_{p1}$ ratio of 9/1, though the w/l ratios could vary widely depending on the implementation.

The second circuit element 404 is a second inverter made up of a second nmos transistor 418 and a second pmos transistor 420, whose gate electrodes receive a second input signal (in2) and whose source/drain regions deliver a second output signal (out2). For purposes of illustration, the second nmos transistor 418 is illustrated as having a width to length ratio ($w_{n2}/l_{n2}$) of 2/1, while the second pmos transistor 420 is illustrated as having a $w_{p2}/l_{p2}$ ratio of 6/1, though the w/l ratios could vary widely depending on the implementation. Because of the w/l ratios present, the second output signal (out2) has a second output current level $i_{o2}$ that is less than the first output current level $i_{o1}$.

The third circuit element 406 is a third inverter made up of a third nmos transistor 422 and a third pmos transistor 424, whose gate electrodes receive a third input signal (in3) and whose source/drain regions deliver a third output signal (out3). For purposes of illustration, the third nmos transistor 422 is illustrated as having a width to length ratio ($w_{n3}/l_{n3}$) of 1/1, while the third pmos transistor 424 is illustrated as having a $w_{p3}/l_{p3}$ ratio of 3/1, though the w/l ratios could vary widely depending on the implementation. Because of the w/l ratios present, the third output signal (out3) has a third output current level $i_{o3}$ that is less than the second output current level ($i_{o2}$).

In some embodiments, the first circuit element 402 can correspond to a first clock buffer circuit (e.g., first clock buffer element 108a in FIG. 1), the second circuit element 404 can correspond to a second clock buffer circuit (e.g., second clock buffer element 108c in FIG. 1), and the third circuit element 406 can correspond to a third clock buffer circuit (e.g., third clock buffer element 108g in FIG. 1). Further, a ratio of the first, second, and third output currents $i_{o1}/i_{o2}/i_{o3}$, can be set to correspond to a ratio of the fan out at the outputs of the respective clock buffer elements. Further, a ratio of the first, second and third line widths can also correspond to the ratio of the output currents and to the ratio of the fan out at the outputs of the respective clock buffer elements.

Figure 5:
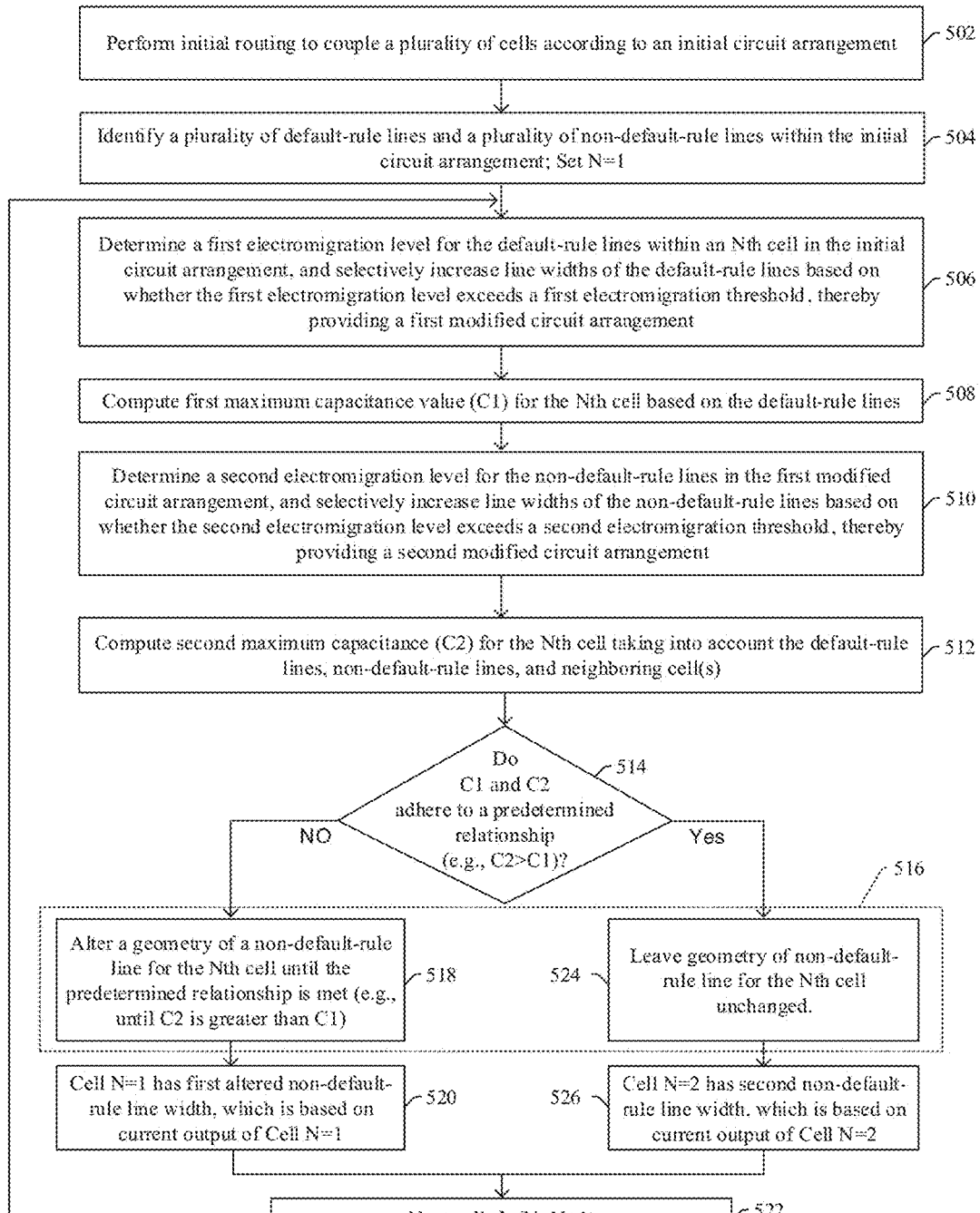
FIG. 5 illustrates a method for circuit design synthesis in accordance with some embodiments.

FIG. 5 illustrates a method as a flowchart 500 in accordance with some embodiments.

While the disclosed method (e.g., the method described by the flowchart 500) is illustrated and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. Further, not all illustrated acts may be required to implement one or more aspects or embodiments of the description herein, and one or more of the acts depicted herein may be carried out in one or more separate acts and/or phases.

At 502, initial routing is performed to couple a plurality of cells according to an initial circuit arrangement. For example, in some embodiments the plurality of cells can be arranged so their outer edges contact outer edges of neighboring cells, and so the plurality of cells are coupled to achieve a circuit arrangement as described in an electronic design specification, such as a SPICE netlist. In some embodiments where the electronic circuit design specification corresponds to a clock tree and the plurality of cells correspond to a plurality of clock buffer elements, respectively, this initial routing may be referred to as clock tree synthesis (CTS).

At 504, the method identifies a plurality of default-rule lines and a plurality of non-default-rule (NDR) lines within the initial circuit arrangement. In some embodiments, the default-rule lines can correspond to one or more lower metal layers, such as polysilicon lines, metal0 lines, metal 1 lines, and metal2 lines that reside entirely within the individual cells; while the non-default-rule lines can correspond to one or more upper metal layers, such as metal 3 lines that extend between the two or more cells to couple different cells to one another. Further, the non-default-rule lines may be lines that have higher sensitivities to timing and/or clock skew compared to the default-rule lines, meaning the rising and falling edges of signals on the non-default-rule lines are closer to a maximum acceptable duty cycle than those of signals on the default rule lines, and can correspond to clock lines in some instances. The non-default-rule lines may be identified according to a tag or label that a designer or software module attaches to the non-default-rule lines. A cell identifier index (N) can also be set to an initial value in block 504, such as N=1.

At 506, a first electromigration level is determined for the default-rule lines within an Nth cell in the initial circuit arrangement. Line widths of the default-rule lines are then selectively increased based on whether the first electromigration level exceeds a first electromigration threshold, thereby providing a first modified circuit arrangement. For example, if a width/length ratio of a transistor driving a default rule line of the Nth cell is expected to drive a current level that is larger than an current-carrying capacity of the default-rule line, such as a polysilicon layer or one or more lower metal layers within the cell output, the line width of the default-rule line in the Nth cell can be increased to reduce the electromigration level for Nth cell to below the electromigration threshold. In some embodiments, only line widths of the polysilicon layers and/or lower metal layers of the Nth cell are adjusted in this block, and line widths of one or more non-default-rule lines are left unchanged (i.e., are not adjusted).

At 508, a first maximum capacitance value (C1) for the Nth cell is calculated based on the default-rule lines, including for example, the polysilicon layer and lower metal layers for the Nth cell. Thus, in some embodiments, the first maximum capacitance value does not take into account one or more non-default-rule lines and/or upper metal layers that couple the Nth cell to neighboring or adjacent cells, and/or does not take into account geometries of other cells that fall outside of the Nth cell.

At 510, a second electromigration level for the non-default-rule lines in the first modified circuit arrangement is determined. Line widths of the non-default-rule lines are then selectively increased based on whether the second electromigration level exceeds a second electromigration threshold, thereby providing a second modified circuit arrangement. For example, if the second electromigration level exceeds the second predetermined electromigration threshold, some embodiments of the method can selectively increase all line widths of the non-default-rule lines to reduce the second electromigration level to below the second predetermined electromigration threshold.

At 512, a second maximum capacitance (C2) is calculated for portions of the non-default-rule lines coupling the Nth cell to at least one other cell. The second maximum capacitance value can take into account the geometry of the default-rule lines in addition to the non-default-rule lines within the Nth cell as well as for other cells in the second modified circuit arrangement.

At 514, the method determines whether C1 and C2 adhere to a predetermined relationship. In some embodiments, the method determines whether C2 is greater than C1.

At 516, the method selectively alters the geometry of one or more non-default-rule lines for the Nth cell until the predetermined relationship is met. For example, in some embodiments, the method selectively alters a line width for the non-default-rule line at the output of a cell while leaving line widths of the lower metal layers unchanged, which keeps standard routing within the cells and streamlines data processing.

For example, if C1 and C2 do not adhere to the predetermined relationship (i.e., "No" at 514), the method proceeds to 518 where a geometry of a non-default-rule line, which couples an output of the Nth cell to a neighboring cell, is adjusted until the predetermined relationship is met (e.g., until C2 is greater than C1). For example, if C2 is less than C1, then the width of the non-default-rule metal line for the Nth cell can be decreased until C2 is less than C1.

Thus, at 520, an example is shown where the Nth cell (N=1) has a first altered line width for the non-default-rule line such that the predetermined condition for C1 and C2 is met. This first line width for the non-default-rule line can based on current output of the Nth cell.

After the N=1 cell has been processed in this manner, the method increments N at 522, and the method proceeds back to 506 and acts 506-514 are then repeated for the next cell, and a determination is made in 514 whether C1 and C2 for the next cell adheres to the predetermined relationship.

If C1 and C2 for the next cell do adhere to the predetermined relationship (i.e., "Yes" at 514), the geometry of the non-default-rule line coupling to the output of the next cell to a neighboring cell remains unchanged in 524. For example, if C2 is greater than C1 for the next cell, then the width of the non-default-rule line for the next cell can remain unchanged.

Thus, at 526, an example is shown where the next cell (N=2) has a second non-default-rule line width such that the predetermined condition for C1 and C2 is met. This second non-default-rule line width for the second non-default-rule line can based on current output of the N=2 cell. Additional cells are processed in a similar manner.

With reference to FIGS. 6A-6C through 9A-9C, a series of illustrations are provided to illustrate some embodiments FIG. 5's method for performing design synthesis. FIGS. 6A, 7A, 8A, and 9A show a schematic view of a circuit at various stages of design synthesis; FIGS. 6B, 7B, 8B, and 9B show top (layout) views of the circuit at the various stages of design synthesis; and FIGS. 6C, 7C, 8C, and 9C show a cross-sectional view of the layout at various stages of design synthesis. Although FIGS. 6A-6C through 9A-9C are described in relation to the method 500, it will be appreciated that FIGS. 6A-6C through 9A-9C are not limited to the method 500, but instead may stand alone. Similarly, although the method 500 is described in relation to FIGS. 6A-6C through 9A-9C, it will be appreciated that the method is not limited to the FIGS. 6A-6C through 9A-9C, but instead may stand alone.

Figure 6A:
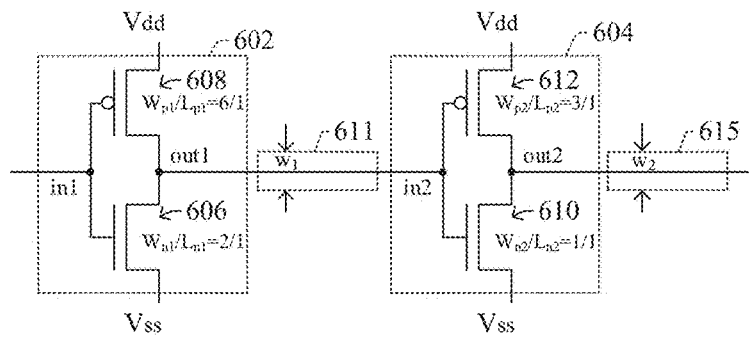
FIGS. 6A-6C through 9A-9C illustrate a series of drawings at various stages of circuit design synthesis in accordance with some embodiments.
Figure 6B:
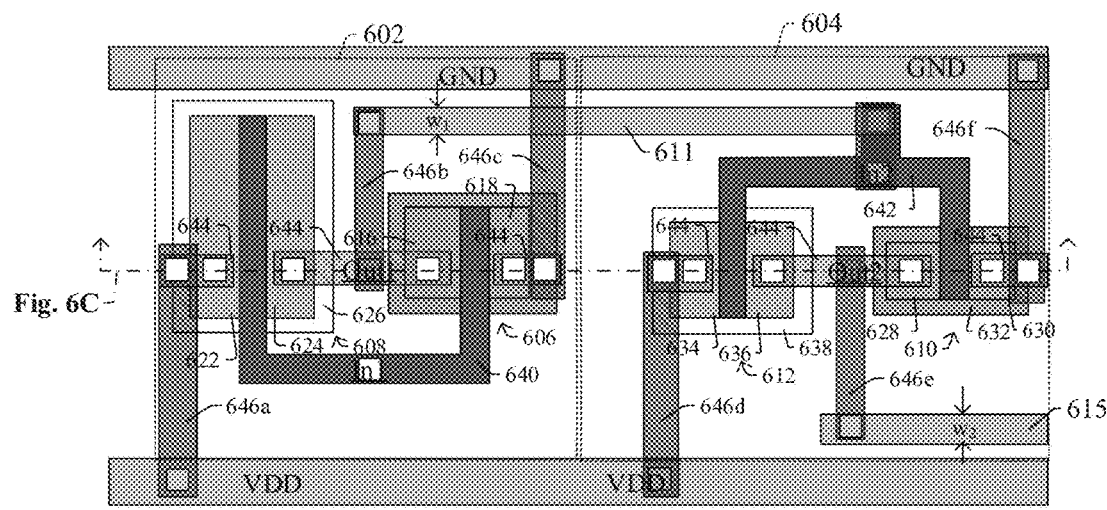
Figure 6C:
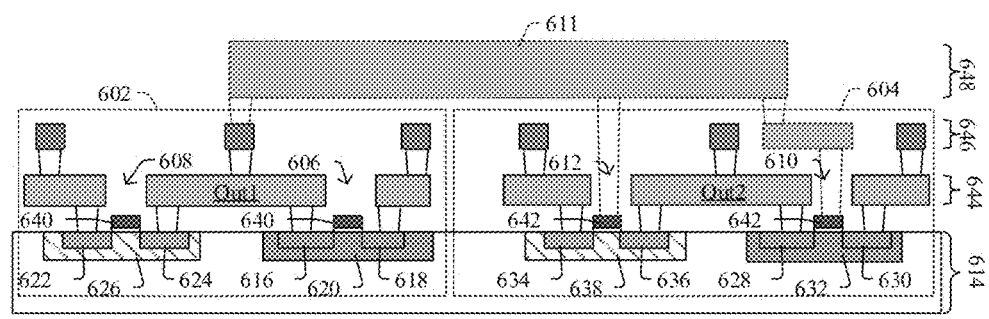

In FIGS. 6A-6C, which are now described concurrently and which can for example correspond to 502 of FIG. 5, a plurality of cells are provided which are to be operably coupled according to an initial circuit arrangement. In the example of FIG. 6A-6C, the cells include a first inverter 602 and a second inverter 604. The first inverter 602 includes a first nmos transistor 606 and a first pmos transistor 608, while the second inverter 604 includes a second nmos transistor 610 and a second pmos transistor 612. The first nmos transistor 606 has a width-to-length ratio ($W_{n1}/L_{n1}$) of 2/1 and the first pmos transistor 608 has a $W_{p1}/L_{p1}$ of 6/1, such that a first output current is driven from the output (out1) of the first inverter. The second nmos transistor 610 has a width-to-length ratio ($W_{n2}/L_{n2}$) of 1/1 and the second pmos transistor 612 has a $W_{p2}/L_{p2}$ of 3/1, such that a second output current, which is less than the first current, is driven from the output (out2) of the second inverter during operation. The first output (out 1) has a first metal line 611 having a first line width, $w_1$; and the second output (out2) has a second metal line 615 having a second line width, $w_2$, which is equal to $w_1$.

As shown in FIG. 6B-6C, the inverters are arranged in or over a substrate 614, such as a monocrystalline silicon substrate or SOI substrate. The first nmos transistor 606 includes first and second source/drain regions (616, 618), which are highly doped with a first conductivity type (e.g., N+), and which can be arranged in a lightly doped well region 620 having a second conductivity type (e.g., P−). The first pmos transistor 608 includes third and fourth source/drain regions (622, 624), which are highly doped with the second conductivity type (e.g., P+), and which can be arranged in a lightly doped well region 626 having the first conductivity type (e.g., N−). The second nmos transistor 610 includes fifth and sixth source/drain regions (628, 630) of the first conductivity type (e.g., N+) and a lightly doped well region 632 having the second conductivity type (e.g., P−); and second pmos transistor 612 includes seventh and eighth source/drain regions (634, 636) of the second conductivity type (e.g., P+) and a lightly doped well region 638 having the first conductivity type (e.g., N−). First and second gate electrodes (640, 642), which can be made from metal or polysilicon, act as data input terminals for the first and second inverters, and metal1 lines 644 and metal2 lines 646 couple the transistors to achieve inverter functionality. Metal 3 lines 648, which can include the first metal line 611 and second metal line 615 couple the inverters to one another. As shown in FIG. 6B, first metal line 611 is setback from the cross-sectional plane depicted in FIG. 6C. Thus, although the first metal line 611 would not be actually seen on the cross-sectional plane depicted in FIG. 6C, the first metal line 611 has been drawn with a dashed outline in FIG. 6C to indicate the operable coupling between out1 of the first inverter 602 and in2 of the second inverter 604 and the height of the first metal line 611 relative to heights of the layers 644, 646. During operation, the voltage on the gate electrodes selectively couples a high voltage (VDD) or low voltage (GND) to the outputs of the first and second inverters, such that the output represents the logical opposite of the input. For example, if the input of an inverter is a high-voltage, the output of the inverter will be a low-voltage, and vice versa.

Figure 7A:
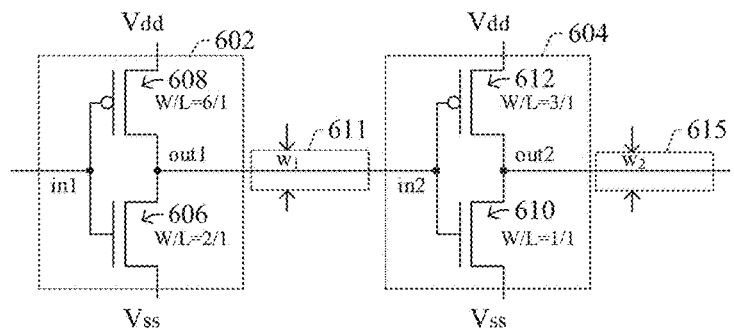
Figure 7B:
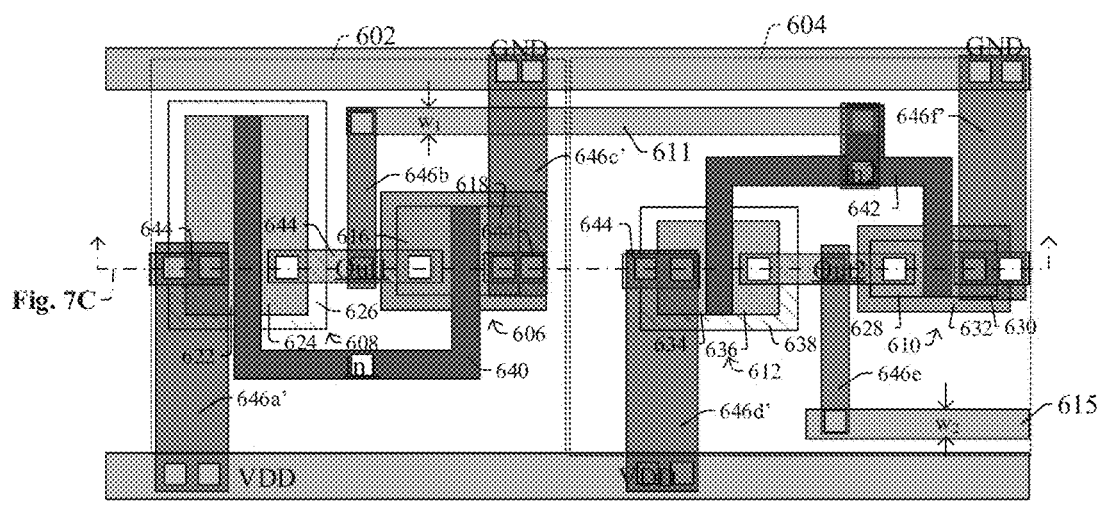
Figure 7C:
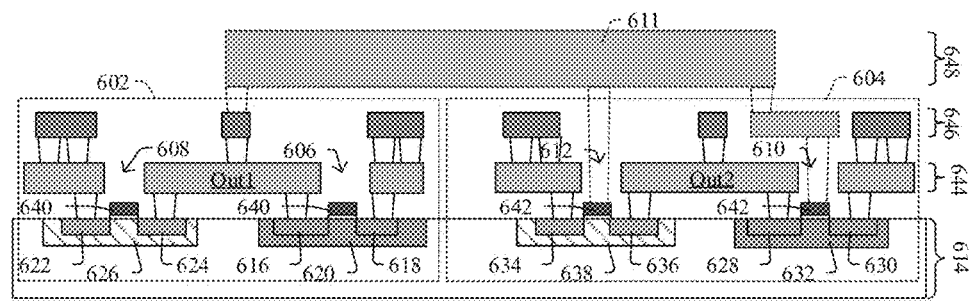

FIGS. 7A-7C, which are now described concurrently, illustrate a first modified circuit arrangement and can for example correspond to 506 of FIG. 5. In the example of FIGS. 7A-7C, default-rule lines (such as metal2 lines 646a, 646b which couple VDD to the pmos transistors 608, 612, and metal2 lines 646c, 646f which couple GND to the nmos transistors 606, 610 in FIG. 6A-6C) may have an electromigration level that exceeds a first electromigration threshold. Thus, the width of these default-rule lines has been increased in the first modified circuit arrangement of FIGS. 7A-7C compared to previous FIGS. 6A-6C. For example, widths of line 646a' in FIG. 7B has been doubled compared to line 646s in FIG. 6B, and width of line 646d' in FIG. 7B has been doubled compared to line 646d in FIG. 6B, although other factors for the change in width could also be used. In some embodiments, upper metal layers and/or non-default-rule layers are not adjusted during this intra-cell electromigration verification. Again, although the first metal line 611 in FIG. 7B would not be actually seen on the cross-sectional plane depicted in FIG. 7C, the first metal line 611 in FIG. 7B has been drawn with a dashed outline in FIG. 7C to indicate the operable coupling between out1 of the first inverter 602 and in2 of the second inverter 604 and the height of the first metal line 611 relative to heights of the layers 644, 646.

Figure 8A:
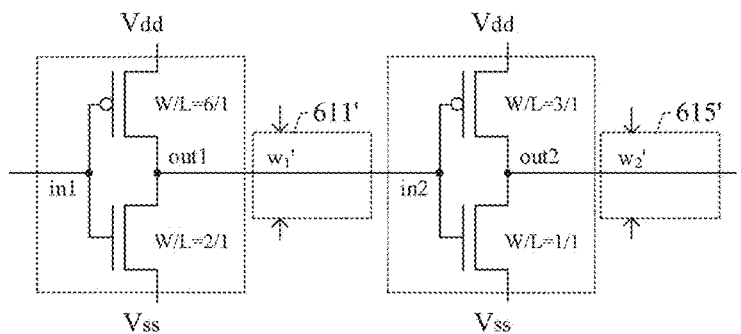
Figure 8B:
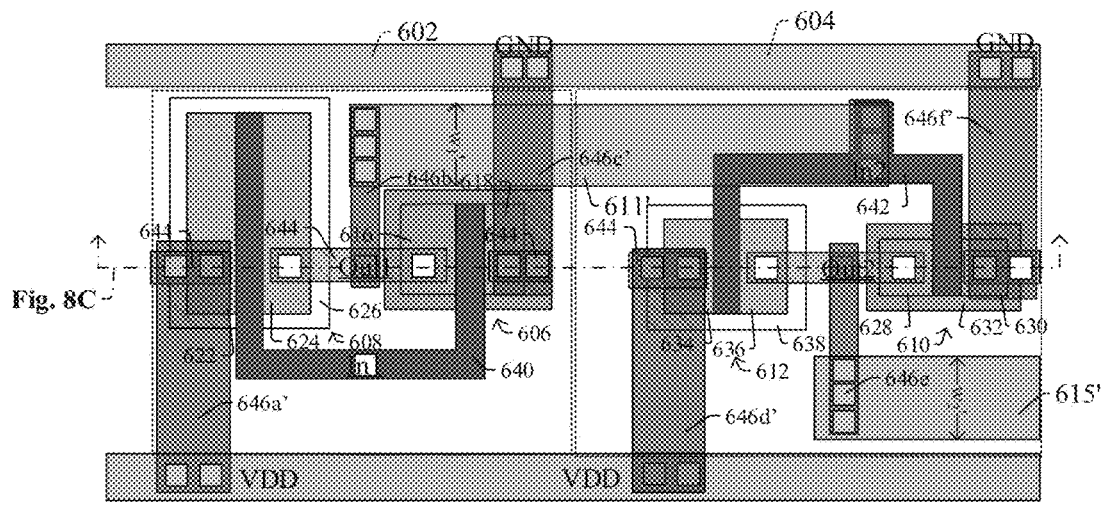
Figure 8C:
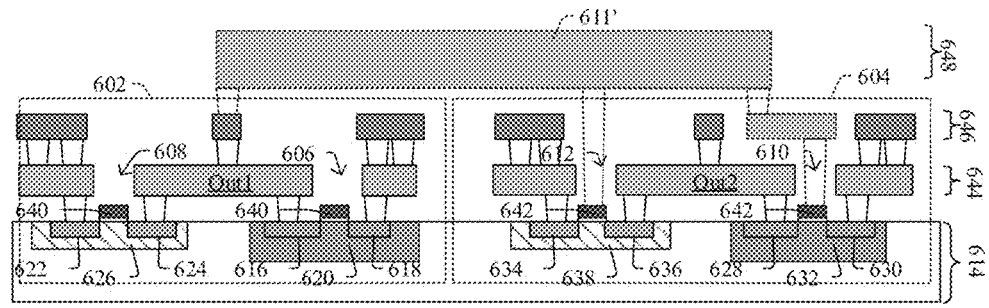

In FIGS. 8A-8C, which are now described concurrently, illustrate a second modified circuit arrangement and can for example correspond to 510 of FIG. 5. In the example of FIGS. 8A-8C example, one or more of the non-default-rule lines (e.g., FIG. 6: metal 3 lines 611, 615) may have an electromigration level that exceeds a second electromigration threshold, and thus, the width of these non-default-rule lines (e.g., FIG. 8 metal3 lines 611', 615') has been increased in the second modified circuit arrangement of FIG. 8A-8C. In some embodiments, the width of these NDR lines 611', 615' in FIG. 8 is a factor of two or a factor of three greater than the first modified circuit arrangement in FIG. 6. For example, widths w1', w2' have been tripled in FIG. 8's embodiment, compared to that of FIG. 6, although other factors for changing the width could be used. In some embodiments, lower metal layers and/or default-rule lines are not adjusted during this inter-cell electromigration verification. Again, although the NDR line 611' in FIG. 8B would not be actually seen on the cross-sectional plane depicted in FIG. 8C, the NDR line 611' in FIG. 8B has been drawn with a dashed outline in FIG. 8C to indicate the operable coupling between out1 of the first inverter 602 and in2 of the second inverter 604 and the height of the NDR line 611' relative to heights of the layers 644, 646.

Figure 9A:
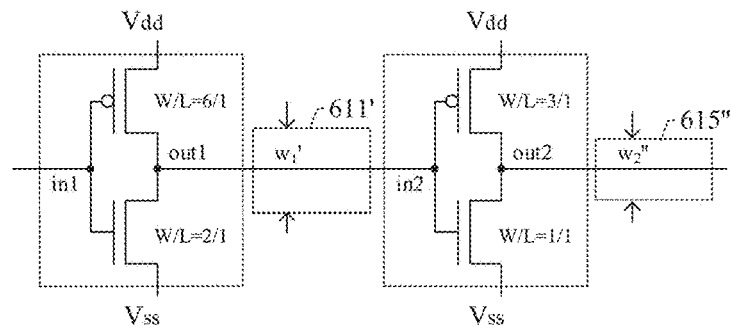
Figure 9B:
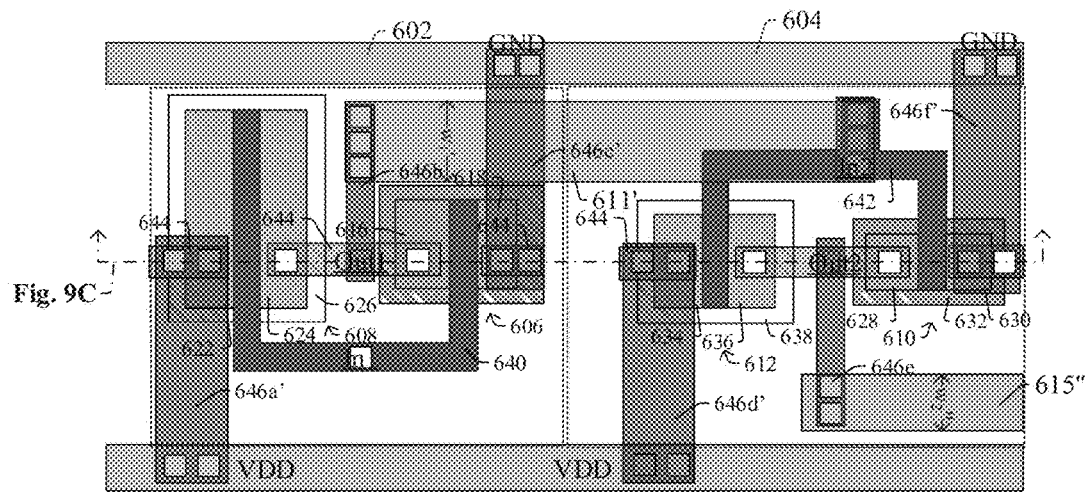
Figure 9C:
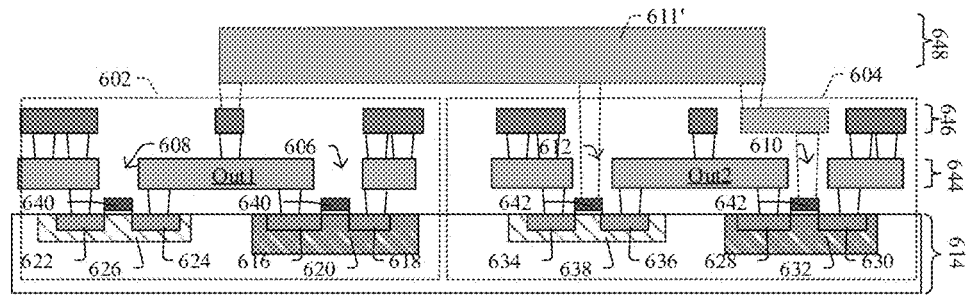

In FIGS. 9A-9C, which are now described concurrently and which can for example correspond to 516 of FIG. 5, a geometry of a non-default-rule line which couples an output of a cell to an input of another cell is altered until the predetermined relationship is met for C1 and C2. In the example of FIGS. 9A-9C, the width of second non-default-rule line 615" has been selectively reduced because its previous width w2' was greater than needed to provide sufficient electromigration protection given the output current expected over the second non-default-rule line. Therefore, the width of the second non-default-rule line 615" has been reduced from being a triple-width w2' in FIG. 8B to a double-width w2" in FIG. 9B, thereby making room for other routing and reducing capacitance. On the other hand, the width w1' of the first non-default-rule line 611' has been left unchanged in FIG. 9B, because a sufficiently large output current is expected over the first non-default-rule line 611' to warrant the triple-wide line thickness w1'. In some embodiments, lower metal layers and/or default-rule lines are not adjusted during this inter-cell electromigration verification.

Figure 10:
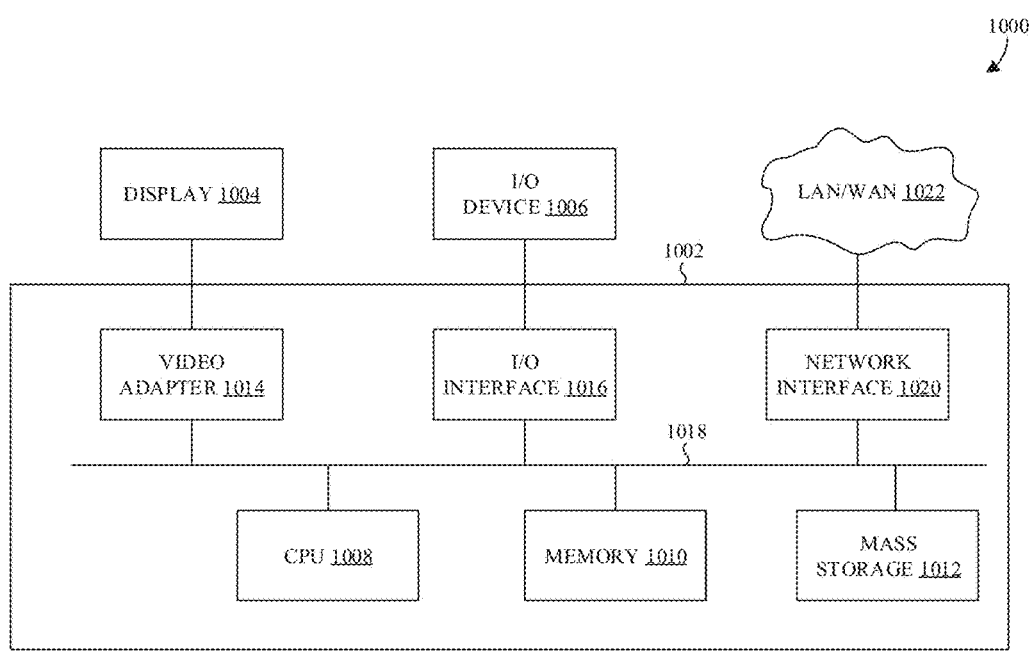
FIG. 10 illustrates a block diagram of some embodiments of a processor-based system for setting a line width of a metal line in accordance with some embodiments.

With reference to FIG. 10, a block diagram 1000 of some embodiments of a process-based system for adjusting line widths based on electromigration characteristics of cell interconnect. Thus, this system, which may manifest as a computing system running auto-place-and-route tools, synthesis tools, timing verification tools, etc., may implement the foregoing methods (e.g., the method of FIG. 5) using computer program code in one or more general purpose computer or processor based system, such as electronic design automation (EDA) tools by Mentor Graphics, Corporation; Cadence Design Systems, Inc; Synopsis, Inc; and others.

As illustrated by FIG. 10, the processor based system is a general purpose computer platform and may be used to implement processes discussed herein. The processor based system may include a processing unit 1002, such as a desktop computer, a workstation, a laptop computer, or a dedicated unit customized for a particular application. Further, the processor based system may be equipped with a display 1004 and one or more input/output (I/O) devices 1006, such as a mouse, a keyboard, or printer.

The processing unit 1002 may include a central processing unit (CPU) 1008, a memory 1010, a mass storage device 1012, a video adapter 1014, an I/O interface 1016 connected to a bus 1018. The bus 1018 may be one or more of any type of several bus architectures, including a memory bus or memory controller, a peripheral bus, or video bus. The CPU 1008 may include any type of electronic data processor, and the memory 1010 may include any type of system memory, such as static random access memory (SRAM), dynamic random access memory (DRAM), or read-only memory (ROM). The mass storage device 1012 may include any type of storage device configured to store data, programs, and other information and to make the data, programs, and other information accessible via the bus 1018. The mass storage device 1012 may include, for example, one or more of a hard disk drive, a magnetic disk drive, or an optical disk drive. The video adapter 1014 and the I/O interface 1016 provide interfaces to couple external devices to the processing unit 1002. Examples of external devices include the display 1004 coupled to the video adapter 1014 and the I/O device 1006, such as a mouse, keyboard, printer, and the like, coupled to the I/O interface 1016. Other devices may be coupled to the processing unit 1002, and additional or fewer interface cards may be utilized. For example, a serial interface card (not shown) may be used to provide a serial interface for a printer. The processing unit 1002 also may include a network interface 1020 that may be a wired link to a local area network (LAN) or a wide area network (WAN) 1022 and/or a wireless link.

It should be noted that the processor based system may include other components. For example, the processor based system may include power supplies, cables, a motherboard, removable storage media, cases, and the like. These other components, although not shown, are considered part of the processor based system. Further, it should be noted that methods described herein may be implemented on the processor based system, such as by program code executed by the CPU 1008.

In some embodiments, the present disclosure relates to a clock tree structure disposed on a semiconductor substrate. The clock tree structure includes a first clock line having a first line width and being arranged at a first height as measured from an upper surface of the semiconductor substrate. The clock tree structure also includes a second clock line having a second line width, which differs from the first line width. The second clock line is arranged at a second height as measured from the upper surface of the semiconductor substrate and the second height is equal to the first height.

Other embodiments relate to an integrated circuit (IC). The IC includes a first circuit element and a second circuit element disposed in or over a semiconductor substrate. The first circuit element has a first input and a first output, and the first output has a first current output level. A first metal line is coupled to the first output, and the first metal line has a first line width that is proportional to the first current output level according to a line-width-to-output-current ratio. The second circuit element has a second input and a second output, and the second output has a second current output level that differs from the first current output level. A second metal line is coupled to the second output. The second metal line has a second line width which differs from the first line width and which is directly proportional to the second current output level according to the line-width-to-output-current ratio.

Still other embodiments relate to a method. In this method, initial routing is performed to couple a plurality of cells according to an initial circuit arrangement. A plurality of default-rule lines and a plurality of non-default-rule lines are identified within the initial circuit arrangement. A first electromigration level for the default-rule lines within a first cell in the initial circuit arrangement is determined, and line widths of the default-rule lines is selectively increased based on whether the first electromigration level exceeds a first electromigration threshold, thereby providing a first modified circuit arrangement. A second electromigration level for the non-default-rule lines in the first modified circuit arrangement is determined, and line widths of the non-default-rule lines are selectively increased based on whether the second electromigration level exceeds a second electromigration threshold, thereby providing a second modified circuit arrangement. A line width of a first non-default-rule line between the cell and at least one other cell is selectively reduced in the second modified circuit arrangement.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   performing initial routing to couple a plurality of cells according to an initial circuit arrangement;
   identifying a plurality of default-rule lines and a plurality of non-default-rule lines within the initial circuit arrangement;
   determining a first electromigration level for the default-rule lines within a first cell in the initial circuit arrangement, and selectively increasing line widths of the default-rule lines based on whether the first electromigration level exceeds a first electromigration threshold, thereby providing a first modified circuit arrangement;
   calculating a first maximum capacitance value for the first cell of the first modified circuit arrangement;
   determining a second electromigration level for the non-default-rule lines in the first modified circuit arrangement, and selectively increasing line widths of the non-default-rule lines based on whether the second electromigration level exceeds a second electromigration threshold, thereby providing a second modified circuit arrangement;
calculating a second maximum capacitance value for the first cell of the second modified circuit arrangement;
selectively reducing a line width of a first non-default-rule line between the first cell and at least one other cell in the second modified circuit arrangement based on whether the first maximum capacitance value adheres to a predetermined relationship with the second maximum capacitance value; and
manufacturing the second modified circuit arrangement with the selectively reduced line width for the first non-default-rule line on a semiconductor substrate.

2. The method of claim 1, wherein the line width of the first non-default-rule line remains unchanged if the second maximum capacitance value is greater than the first maximum capacitance value, and wherein the line width of the first non-default-rule line is reduced if the first maximum capacitance value is greater than or equal to the second maximum capacitance value.

3. The method of claim 1, wherein the non-default-rule lines include clock lines and the default-rule lines include non-clock lines.

4. The method of claim 1, wherein selectively increasing line widths of the default-rule lines comprises:
increasing an initial line width of a default-rule line such that the increased line width in the first modified circuit arrangement is an integer multiple of the initial line width.

5. The method of claim 1, wherein the manufactured integrated circuit arrangement comprises:
a first clock line having a first line width and being arranged at a first height as measured from an upper surface of the semiconductor substrate; and
a second clock line having a second line width, which differs from the first line width, the second clock line being arranged at a second height as measured from the upper surface of the semiconductor substrate and the second height being equal to the first height.

6. A method for providing an integrated circuit arrangement on a semiconductor substrate, comprising:
performing an initial routing to couple a plurality of transistors to one another through a metal interconnect layer, wherein the metal interconnect layer includes a plurality of metal lines each spaced at a same predetermined height above the semiconductor substrate;
identifying a plurality of clock-tree metal lines and a plurality of non-clock-tree metal lines within the metal layer;
determining respective electromigration levels for the respective clock-tree metal lines based on respective current levels expected to be supplied through the respective clock-tree metal lines;
based on the determined electromigration levels, selectively increasing line widths for some of the plurality of clock-tree metal lines while leaving line widths for other of the plurality of clock-tree metal lines unchanged, thereby providing a first modified circuit arrangement;
calculating a first maximum capacitance value for a first cell within the first modified circuit arrangement;
selectively changing a line width of one or more non-clock-tree metal lines in the first modified circuit arrangement, thereby providing a second modified circuit arrangement;
calculating a second maximum capacitance value for the first cell within the second modified circuit arrangement;
selectively modifying the second modified circuit arrangement based on whether the first maximum capacitance value adheres to a predetermined relationship with the second maximum capacitance value;
receiving a semiconductor substrate; and
manufacturing the integrated circuit arrangement on the semiconductor substrate in accordance with the selectively altered line widths of the first clock-tree metal line.

7. The method of claim 6, wherein the line widths are increased for only the some of the plurality of clock-tree metal lines while line widths for the other of the plurality of clock-tree metal lines and line widths for the plurality of non-clock-tree metal lines remain un-changed.

8. The method of claim 6, wherein the non-clock-tree metal lines have a line width that is independent of the currents carried by the respective non-clock-tree metal lines.

9. The method of claim 6, wherein the non-clock-tree metal lines each have the same line width as one another.

10. The method of claim 6, wherein a first non-clock-tree metal line has a first line width and is expected to carry a first current, and a second non-clock-tree metal line has the first line width and is expected to carry a second current, the second current differing from the first current.

11. The method of claim 6, further comprising:
determining respective electromigration levels for the respective non-clock-tree metal lines based on respective current levels expected to be supplied through the respective non-clock-tree metal lines; and
setting respective line widths for the respective non-clock-tree metal lines to different line-widths based on the determined respective electromigration levels.

12. The method of claim 11, wherein a first non-clock-tree metal line has a first line width and has a first electromigration level, and a second non-clock-tree metal line has a second line width and a second electromigration level, the second electromigration level being greater than the first electromigration level and the second line width being greater than the first line width.

13. The method of claim 12, wherein the second line width is an integer multiple of the first line width, the integer multiple being greater than one.

14. The method of claim 13, wherein the integer multiple is 3 or more.

15. A method for providing an integrated circuit arrangement on a semiconductor substrate, comprising:
providing a metal interconnect layer that couples a plurality of transistors according to an initial circuit arrangement; wherein the metal interconnect layer includes a plurality of metal lines each spaced at a same predetermined height above the semiconductor substrate;
identifying a plurality of default-rule metal lines and a plurality of non-default-rule metal lines within the plurality of metal lines in the initial circuit arrangement;
determining a first electromigration level for the default-rule metal lines within a first cell in the initial circuit arrangement, and selectively increasing line widths of the default-rule metal lines based on whether the first electromigration level exceeds a first electromigration threshold, thereby providing a first modified circuit arrangement;

calculating a first maximum capacitance value for the first cell of the first modified circuit arrangement;

determining a second electromigration level for the non-default-rule metal lines in the first modified circuit arrangement, and selectively increasing line widths of the non-default-rule metal lines based on whether the second electromigration level exceeds a second electromigration threshold, thereby providing a second modified circuit arrangement; and calculating a second maximum capacitance value for the first cell of the second modified circuit arrangement;

selectively reducing a line width of a first non-default-rule metal line between the first cell and at least one other cell in the second modified circuit arrangement based on whether the first maximum capacitance value adheres to a predetermined relationship with the second maximum capacitance value;

manufacturing the integrated circuit arrangement on the semiconductor substrate in accordance with the selectively altered line width of the first non-default rule metal line.

16. The method of claim 15, wherein the line widths are increased for only some of the plurality of non-default-rule metal lines while line widths for other of the plurality of default-rule metal lines and line widths for the plurality of non-default-rule metal lines remain un-changed.

17. The method of claim 15, wherein the default-rule metal lines have a line width that is independent of currents carried by the respective default-rule metal lines.

18. The method of claim 15, wherein the default-rule metal lines each have the same line width as one another.

19. The method of claim 15, wherein a first default-rule metal line has a first line width and is expected to carry a first current, and a second default-rule metal line has the first line width and is expected to carry a second current, the second current differing from the first current.

20. The method of claim 15, wherein the manufactured integrated circuit arrangement comprises:

a first clock line having a first line width and being arranged at a first height as measured from an upper surface of the semiconductor substrate; and a second clock line having a second line width, which differs from the first line width, the second clock line being arranged at a second height as measured from the upper surface of the semiconductor substrate and the second height being equal to the first height.

* * * * *